United States Patent [19]

Mantion et al.

[11] 4,360,153
[45] Nov. 23, 1982

[54] FOLDABLE TRACTION-MAT FOR MOTOR VEHICLES

[76] Inventors: Richard Mantion, 375-A Louis-Fortier, LaSalle, Quebec, Canada, H8R 3K4; Jean-Paul Normandeau, 11,023 Hébert, Montreal Nord, Quebec, Canada, H1H 3X2

[21] Appl. No.: 235,710

[22] Filed: Feb. 18, 1981

[51] Int. Cl.³ .............................................. E01B 23/00
[52] U.S. Cl. ....................................... 238/14; 404/35
[58] Field of Search ............. 238/14; 152/208; 180/7, 180/7 R; 36/7.6, 7.7, 59 R, 59 A, 59 B, 59 C, 59 D; 404/35, 36, 19

[56] References Cited

U.S. PATENT DOCUMENTS

| | | | |
|---|---|---|---|
| 2,022,655 | 12/1935 | Driscoll | 36/7.7 |
| 2,248,537 | 7/1941 | Libbey | 238/14 |
| 2,422,006 | 6/1947 | Friedman | 238/14 |
| 2,443,319 | 6/1948 | Mack | 238/14 |
| 3,291,393 | 12/1966 | May | 238/14 |
| 3,350,013 | 10/1967 | Bergquist | 238/14 |
| 3,425,624 | 2/1969 | Jacobs | 238/14 |
| 3,918,638 | 11/1975 | Nelson | 238/14 |

FOREIGN PATENT DOCUMENTS 38282  11/1923  Norway ................................ 36/7.6

*Primary Examiner*—Joseph F. Peters, Jr.
*Assistant Examiner*—M. J. Hill
*Attorney, Agent, or Firm*—Thierry Orlhac

[57] ABSTRACT

An improved, foldable traction mat comprising a plurality of bars pivoted together to form a grid-like traction member when the mat is opened up for use. The bars pivot into generally parallel, closely adjacent position when the mat is folded up for storage.

7 Claims, 3 Drawing Figures

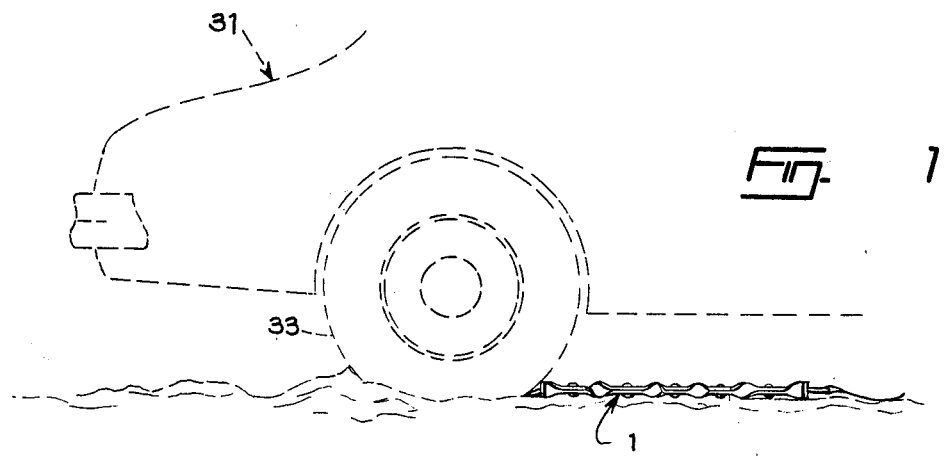
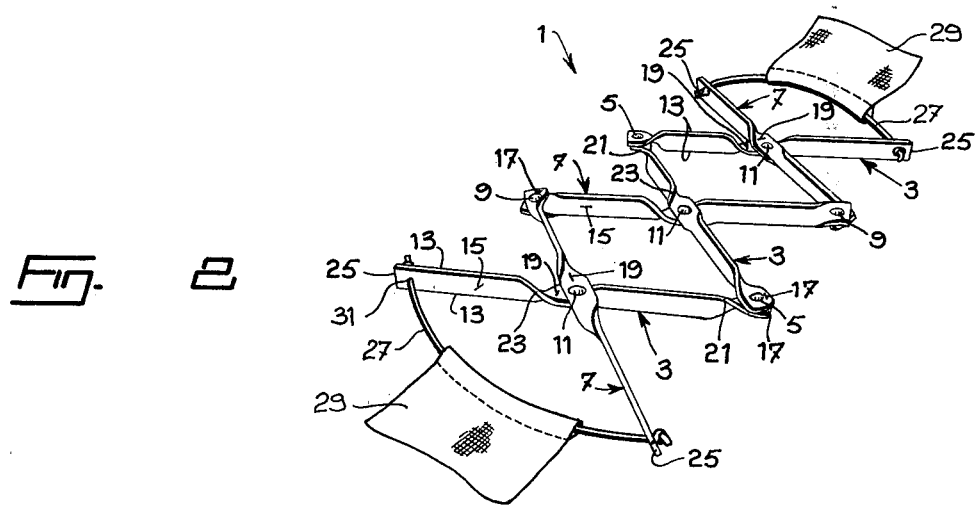
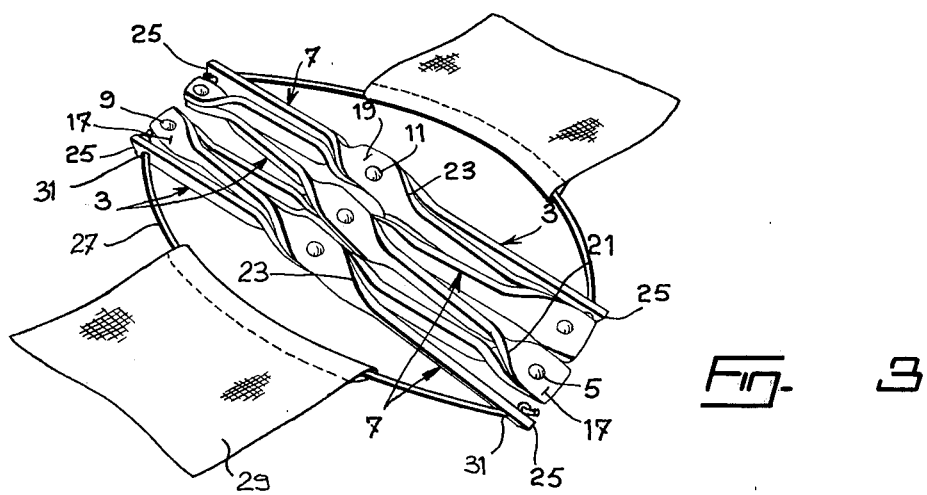

FOLDABLE TRACTION-MAT FOR MOTOR VEHICLES

The present invention relates to an improved foldable traction mat.

Tractions mats are well known. They are usually employed when a vehicle becomes stuck in ice or snow. The mat is placed on the ground adjacent and under the stuck vehicle drive wheel to provide a tractive surface for the wheel.

The most effective mats appear to be rigid, grid-like mats. The bottom edges of the grid members in the mats bite into the ice and/or snow while the top edges provide good traction for the wheel, providing overall superior traction qualities. The rigid grid-like mats are also strong and durable. However, these rigid, grid-like mats take up a lot of storage space in a vehicle when not in use.

To avoid this drawback, foldable grid-like traction mats have been proposed, which mats can be folded so as to be stored in a minimum amount of space.

Such foldable grid-like traction mats are well known as shown by U.S. Pat. Nos. 2,248,537 and 3,425,624 by way of example. However these known foldable mats have disadvantages. Many do not present a sufficiently rigid, grid-like structure when unfolded. Also many do not fold into a very compact bundle.

It is therefore the purpose of the present invention to provide an improved traction mat which can be folded into a very compact bundle for storage, and which can be unfolded for use to provide a relatively rigid, grid-like mat with excellent traction properties.

The mat of the present invention employs a plurality of traction bars which are hinged or pivoted together to provide a grid-like mat when the bars are spread apart. The bars are arranged to have their narrow sides or edges facing up and down, that is they stand on edge, when the mat is in use so as to provide good traction. The bars are arranged to lie close together, generally parallel to each other, when the mat is folded.

In accordance with the broad concept of the invention, there is provided and claimed herein a traction mat comprising: a first set of traction bars arranged end to end and joined together at their adjacent ends by first pivot means; a second set of traction bars, equal in number to the first set, arranged end to end and joined together at their adjacent ends by second pivot means; the bars in both sets being arranged with their wide sides facing each other, each bar of the first set crossing a corresponding bar of the second set generally at their mid-points; third pivot means pivotably connecting each crossed pair of bars together; wherein the end portions and the central portion of each bar are twisted about the longitudinal axis of the bar to be ninety degrees out of phase with the remainder of the bar, and wherein the end and central twisted portions are sized to have the transition portion on one bar extending between the twisted and untwisted portions, interfering with the twisted portion of an adjacent bar to limit movement between the bars.

The invention will now be better understood upon reading of the following description of a preferred embodiment thereof, with reference to the accompanying drawings in which:

FIG. 1 illustrates an improved traction mat made according to the invention, in use;

FIG. 2 is a perspective view of the traction mat of FIG. 1 in an unfolded position; and FIG. 3 is a perspective view of the traction mat of FIGS. 1 and 2 in a folded position.

The foldable traction mat 1 as shown in the Figures, includes a first set of traction bars 3. The bars 3 are arranged end-to-end and are pivotably joined together at adjacent ends by first pivot means 5. The traction mat 1 also includes a second set of traction bars 7, equal in size and number to the bars 3 in the first set. The bars 7 of second set are also arranged end-to-end and are pivotally joined together at adjacent ends by second pivot means 9. Each bar 3 of the first set crosses, at its mid-point, a corresponding bar 7 of the second set at its mid-point. Third pivot means 11 pivotably connect each crossed pair of bars 3 and 7 together.

Each bar 3 or 7 in the mat has a pair of opposed narrow sides or edges 13, and a pair of opposed wide sides 15. The bars 3 and 7 in each set are arranged with their wide sides 15 facing each other and are adapted to stand on one edge 13. To this end, the end portions 17 of each bar 3 or 7 are twisted or bent through ninety degrees relative to the main portion of the bar thereby defining flat lands. The end portions 17 or flat lands of adjacent bars in each set overlap and the pivot means 5 or 9 which join the bars together, pass through the overlapped end portions or lands 17 as seen in FIG. 2. The pivot means 5 and 9 can comprise rivets, or bolts, or any other suitable fastening means.

In addition, the central portion 19 of each bar 3 or 7 is also twisted or bent through ninety degrees relative to the main portion of the bar to define a flat land, the flat land or central portion 19 of each bar 3 or 7 being parallel to its end portions or lands 17. The bars 3 and 7 of the two sets cross at the central portions or lands 19 with the central portion or land 19 of one bar 3 overlapping the central portion or land 19 of the other bar 7. The pivot means 11 join the crossed bars 3 and 7 together passing through the overlapped central portions or lands 19. Again the pivot means 11 can comprise rivets, or bolts, or any other suitable fastening means.

The twisted end portions or lands 17, are sized to allow the bars 3 and 7 to move a predetermined distance between a closed, generally parallel position, when the mat is folded, and an open almost perpendicular position when the mat is unfolded. To this end, the twisted end portions or lands 17 are made small enough so that the transition portions 21 defined between the end portions or lands 17 and the untwisted portions of the bar, interfere with end portions or lands 17 after the mat has opened a predetermined distance so as to limit opening of the mat.

The central twisted portions or lands 19 are also sized in a similar manner to control opening of the mat, with the transition portions 23 between the central portion or land 19 and the untwisted portions of any bar interfering with the central portion or land of a crossing bar to limit its movement to a predetermined amount.

The free ends 25 of the end bars need not be twisted. Preferably, a cord 27 made of NYLON ® or of any other plastic material and on which is mounted a piece 29 of rough fabric or rubber is attached to at least one, and preferably both ends of the mat. The ends of the cord 27 can be fixed through holes 31 provided in the end bars adjacent their free ends 25.

In use, the mat 1 is normally folded into a compact bundle, as shown in FIG. 3, and is stored in the vehicle 31. In the folded, stored position, the bars 3 and 7 lie generally parallel to each other. To use the mat 1, when the vehicle is stuck, the mat 1 is unfolded to its open position to provide an open, grid-like, generally rigid traction member. The mat 1 is unfolded until the bars 3 and 7 interfere with each other to limit movement. The cords 27 at the ends of the mat are pulled apart to open up the mat. The piece of fabric or rubber 29 mounted onto the cord 27 at one end of the mat 1 is then inserted under the front of the stuck drive wheel 33 of the vehicle 31 as shown in FIG. 1. When the stuck wheel 33 is subsequently rotated, it pulls the piece of fabric or rubber 29 and thus automatically urges the mat 1 to completely open as the edges 13 of some of its bars 3 and 7 bite in the slippery surface. Then the stuck wheel rides up and over the mat while the same is extended in its maximum length and blocked up by the weight of the vehicle. When the wheel 33 passes over the other cord 27 and piece of fabric or rubber 29 at the other end of the mat, it pushes it back and thus automatically folds the mat, thus reducing the risk for the mat to be projected by the wheel behind the vehicle. The mat can then be retrieved and stored.

We claim:

1. A traction mat comprising:
   a first set of traction bars arranged end to end and joined together at their adjacent ends by first pivot means;
   a second set of traction bars, equal in number to the first set, arranged end to end and joined together at their adjacent ends by second pivot means;
   the bars in both sets being arranged with their wide sides facing each other, each bar of the first set crossing a corresponding bar of the second set generally at their mid-points;
   third pivot means pivotably connecting each crossed pair of bars together;
   wherein the end portions and the central portion of each bar are twisted about the longitudinal axis of the bar to be ninety degrees out of phase with the remainder of the bar, and
   wherein the end and central twisted portions are sized to have the transition portion on one bar extending between the twisted and untwisted portions, interfering with the twisted portion of an adjacent bar to limit movement between the bars.

2. A traction mat as claimed in claim 1, further including at least one cord fastened to the bars at one end of the mat and a piece of rubber or fabric mounted onto said cord.

3. A traction mat comprising:
   a first set of traction bars interconnected end-to-end and standing on edge; each bar of this first set being, at the interconnected ends and at the center thereof, twisted out of the plane of the remainder of the bar to define flat lands, the lands of interconnected ends of adjacent bars overlapping one another, and pivot means interconnecting said overlapping end lands;
   a second set of traction bars, equal in number to the number of bars of the first set, said bars of said second set being interconnected end-to-end and standing on edge; each bar of this second set being, at the interconnected ends and at the center thereof, twisted out of the plane of the remainder of the bar to define flat lands, the lands of interconnected ends of adjacent bars overlapping one another, and pivot means interconnecting said overlapping end lands of the bars of said second set, and
   wherein each bar of the first set crosses a corresponding bar of the second set with the central flat lands overlapping one another, and pivot means interconnecting said central overlapping lands.

4. A traction mat as claimed in claim 3, wherein each bar is, at the interconnected ends and at the center, twisted about the longitudinal axis thereof to be 90° C. out of phase with the remainder of the bar, thereby defining said lands.

5. A traction mat as claimed in claim 4, wherein said bars are formed with transition portions between the twisted and untwisted portions thereof, and said lands are sized to have the transition portions on one bar interfere with like transition portions of an adjacent bar to limit movement between said one bar and said adjacent bar.

6. A traction mat as claimed in claim 3, 4 or 5, wherein each set of bars includes two terminal bars each having a free unconnected end, and a flexible cord fixed to the free unconnected end of adjacent terminal bars for pulling said traction mat to stretched-out operative position.

7. A traction mat as claimed in claim 3, 4 or 5, wherein each set of bars includes two terminal bars each having a free unconnected end, and a flexible cord fixed to the free unconnected end of adjacent terminal bars for pulling said traction mat to stretched-out operative position, and further including a sheet of flexible material mounted, along one edge thereof, to each flexible cord to extend away from said mat interconnected bars.

* * * * *